United States Patent [19]

Mikuni et al.

[11] Patent Number: 5,869,197
[45] Date of Patent: Feb. 9, 1999

[54] ACRYLIC RUBBER COMPOSITION

[75] Inventors: Kenji Mikuni; Shingo Kawano, both of Kanagawa, Japan

[73] Assignee: NOK Corporation, Tokyo, Japan

[21] Appl. No.: 814,153

[22] Filed: Mar. 10, 1997

Related U.S. Application Data

[63] Continuation of Ser. No. 337,410, Nov. 7, 1994, abandoned, which is a continuation of Ser. No. 164,575, Dec. 10, 1993, abandoned.

[30] Foreign Application Priority Data

Dec. 16, 1992 [JP] Japan ............................ 4-354614

[51] Int. Cl.$^6$ ............................................. C10M 105/04
[52] U.S. Cl. ........................ 428/615; 428/624; 428/625; 428/626; 428/686
[58] Field of Search .................................. 428/615, 624, 428/625, 626, 686

[56] References Cited

U.S. PATENT DOCUMENTS

| | | | |
|---|---|---|---|
| 2,325,979 | 8/1943 | Sarbach ........................................ | 525/2 |
| 4,082,862 | 4/1978 | Esemplare et al. ..................... | 428/494 |
| 4,307,007 | 12/1981 | Brodoway . | |
| 4,376,231 | 3/1983 | Sabia et al. .............................. | 428/372 |

FOREIGN PATENT DOCUMENTS 63-218751  12/1988  Japan .

OTHER PUBLICATIONS

Alvino; "Preventing Resins From Adhering to a Substrate"; (1971), CA# 80:4405.

DuPont; "An Improved Release System for Ethylene Elastomers"; (1978), CA# 88(14):90773y.

Miyabayashi; "Heat and Gasoline–Resistant Blend Laminate for Fuel Hoses"; (1991), CA# 115(8):73452b, (ABS only).

Alvino, "Preventing Resins From Adhering to a Substrate", (1971), CA# 80:4405.

DuPont: Inf. Sys. Dept., "An Improved Release System for Acrylase Elastomers" (1978) CA88(14):90773y.

Miyabashi et al., "Heat and Gasoline–Resistant Acrylic Rubber Blend Laminate for Fuel Hoses" (1991), CA115(8):73452b, [ABS only].

*Primary Examiner*—Cecilia J. Tsang
*Assistant Examiner*—Patrick R. Delaney
*Attorney, Agent, or Firm*—Barnes & Thornburg

[57] ABSTRACT

An acrylic rubber composition comprising 100 parts by weight of acrylic rubber containing cross-linkable groups and 2 to 40 parts by weight of tri(2-ethylhexyl) phosphate has quite an unexpected effect on prevention of fixation of its vulcanized rubber moldings to metallic materials or resin moldings when brought into direct contact with the latter due to the presence of tri(2-ethylhexyl) phosphate in the acrylic rubber containing cross-linkable groups.

10 Claims, No Drawings

ACRYLIC RUBBER COMPOSITION

This is a Continuation of application Ser. No. 08/337,410, filed Nov. 7, 1994 now abandoned which is a Continuation of application Ser. No. 08/164,575 filed Dec. 10, 1993, now abandoned.

BACKGROUND OF THE INVENTION

1) Field of the Invention

The present invention relates to an acrylic rubber composition, and more particularly to an acrylic rubber composition having a property to prevent fixation to a metal, etc.

2) Description of the Prior Art

Acrylic rubber is used as molding materials for sealing rubber such as packings, O-ring, etc. and has such a tendency that the rubber is fixed to materials in direct contact with the rubber, for example, metals such as cast iron, aluminum, stainless steel, soft steel, etc., or resins such as polyamide resin, phenol resin, etc., thereby lowering the sealing effect. Such a tendency is often observed particularly in case of acrylic rubber having cross-linkable groups such as reactive halogen, epoxy group, etc. in the acrylic rubber molecules.

The term "fixation or fixing" used herein designates a state of sealing rubber, which cannot be peeled off from a material, especially cast iron or mild steel, in contact with the sealing rubber by strong adhesion due to reaction therebetween, when the sealing rubber and the material in contact therewith are compressed by about 10 to about 40% and left standing in air or working oil at a predetermined temperature for a predetermined time.

Various methods have been so far proposed, as given below, to solve the problem of fixation, but have not been found successful:

(1) A method of adding a relatively large amount of a plasticizer, etc. to the rubber, thereby bleeding the plasticizer, etc. from the rubber to prevent any direct contact with a mating material. The method is economically best, but the physical properties of the rubber are largely lowered by the bleeding.

(2) A method of depositing a solid lubricant onto the rubber. The method suffers from easy release of a solid lubricant such as graphite, molybdenum disulfide, etc. from the rubber, resulting in unstable properties and contamination of working oil with the released solid lubricant to form foreign matters.

(3) A method of coating a sealing material with a composition of a rubber-based binder and a solid lubricant as main ingredients, dispersed in a solvent. The method usually suffers from a poor adhesion to the sealing material and has no satisfactory effect on the prevention of fixation.

SUMMARY OF THE INVENTION

An object of the present invention is to provide an acrylic rubber composition having a good property to prevent fixation and substantially free from lowering of physical properties of rubber, which comprises acrylic rubber, particularly acrylic rubber having cross-linkable groups and a solidification-preventing agent.

DETAILED DESCRIPTION OF THE INVENTION

The object of the present invention can be attained by an acrylic rubber composition, which comprises 100 parts by weight of acrylic rubber and 2 to 40 parts by weight of trioctyl phosphate.

The acrylic rubber for use in the present invention includes polymers of (a) alkyl acrylate having an alkyl group with 1 to 8 carbon atoms, polymers of (b) alkoxyalkyl acrylate having an alkoxyalkylene group with 2 to 8 carbon atoms or copolymers of the alkyl acrylate in (a) and the alkoxyalkyl acrylate in (b), wherein the components (a) and (b) are copolymerized in a mole ratio of 10:90 to 90:10, and preferably includes copolymers obtained by further copolymerizing into the polymers of the alkyl acrylate in (a) or the alkoxyalkyl acrylate in (b) or the copolymers of the alkyl acrylate in (a) and the alkoxyalkyl acrylate in (b), with about 0.05 to 20% by mole, preferably about 0.1 to 10% by mole of at least one of the following monomers (c) having a cross-linkable group:

($C_1$) vinyl monomer having an epoxy group,
($C_2$) vinyl monomer having a carboxyl group,
($C_3$) vinyl monomer having a reactive halogen,
($C_4$) vinyl monomer having a hydroxyl group,
($C_5$) vinyl monomer having an amide group, and
($C_6$) dienic monomer.

The polymers or copolymers can be obtained by replacing a portion, particularly up to about 20% by mole, of at least one of the alkyl acrylate in (a) and the alkoxyalkyl acrylate in (b) with other copolymerizable monomers such as vinyl, vinylidene or diene monomers.

Trioctyl phosphate, particularly tri(2-ethylhexyl) phosphate, for use in the present invention as a fixation-preventing agent can be used in an amount of about 2 to about 40 parts by weight, preferably about 5 to about 15 parts by weight, on the basis of 100 parts by weight of acrylic rubber. Below about 2 parts by weight, no remarkable effect on the prevention of fixation is obtained, whereas about 40 parts by weight the physical properties of the resulting vulcanized rubber products is deteriorated.

Trialkyl phosphates including the tri(2-ethylhexyl) phosphate are also used as plasticizers for synthetic rubber. Japanese Patent Publication (Kokai) 63-218,751 filed by the present applicant discloses an acrylic rubber composition comprising acrylic rubber copolymerized with various monomers having a cross-linkable group, which includes a reactive halogen-containing vinyl monomer, a plasticizer and an electrolyte substance, but makes no specific mention of trialkyl phosphates as plasticizers. It is the present invention that discloses that among various trialkyl phosphates only trioctyl phosphate has an unexpected effect on the prevention of fixation, when added to acrylic rubber, particularly acrylic rubber having cross-linkable groups.

The present acrylic rubber composition comprising acrylic rubber and trioctyl phosphate as essential components contains various necessary additives including a cross-linking agent, and is vulcanized under cross-linking conditions for acrylic rubbers as usually employed. The following cross-linking agents are used in the present invention according to the kind of the cross-linking groups contained in the monomers ($C_1$) to ($C_5$) in the acrylic rubber:

($C_1$) For the vinyl monomer having an epoxy group including, for example, allylglycidyl ether, glycidyl acrylate, glycidyl methacrylate, etc., such cross-linking agents as polyamines, for example, diethylenetriamine, metaphenylenediamine, etc.; polycarboxylic acids, for example, adipic acid, etc.; acid anhydrides, for example, pyromellitic anhydride, maleic anhydride, etc.; and polyamides; sulfonamides, etc. can be used.

($C_2$) For the vinyl monomer having a carboxyl group including, for example, acrylic acid, methacrylic acid, itaconic acid etc., such cross-linking agents as polyepoxides, for example, ethyleneglycol diglycidyl ether 1,6-hexanediol diglycidyl ether, etc.; and polyols, for example, 1,4-butanediol, 1,1,1-trimethylolpropane, etc. can be used. Cross-linking can be carried out only by heating without using these cross-linking agents.

($C_3$) For the vinyl monomer having a reactive halogen including, for example, 2-chloroethylvinyl ether, etc., such cross-linking agents as polyamines, for example, diethylenetriamine, triethylene-tetramine, etc.; and polycarbamates, for example, hexamethylenediamine carbamate, etc. can be used.

($C_4$) For the vinyl monomer having a hydroxyl group including, for example, hydroxyalkyl methacrylate, hydroxyalkoxy acrylate, N-methylolacrylic acid amide, etc., such cross-linking agents as polyisocyanates, for example, hexamethylene diisocyanate, tolylene diisocyanate, etc.; polycarboxylic acids, for example, adipic acid, etc.; and alkoxymethylmelamines, for example, methoxymethylmelamine, etc. can be used.

($C_5$) For the vinyl monomer having an amido group including, for example, acryl amide, methacryl amide, etc. such cross-linking agents as aminoformaldehyde, etc. can be used. Cross-linking can be carried out only by heating.

($C_6$) For the dienic monomers including, for example, divinyl benzene, isoprene, pentadiene, vinylcyclohexene, chloroprene, butadiene, methylbutadiene, cyclopentadiene, methylpentadiene, ethyleneglycol diacrylate, propyleneglycol diacrylate, ethyleneglycol dimethacrylate, propyleneglycol dimethacrylate, etc., such cross-linking agents as sulfur; organic peroxides, for example, benzoyl peroxide, dicumyl peroxide, etc.; azo compounds, for example, azobisisobutyronitrile, etc.; divinyl benzene; triallyl cyanurate, triallyl isocyanurate, etc. can be used. Cross-linking can be carried out only by heating without using these cross-linking agents.

It has been well known that tri(2-ethylhexyl) phosphate can give a fire resistance, a low temperature resistance, a flame retardness, a light resistance, a water resistance, an electric insulation, etc. to rubber, when added thereto as a plasticizer, but a quite unexpected effect on the prevention of fixation can be obtained in direct contact of the resulting vulcanized moldings with metallic materials or resin molding, when it is added to acrylic rubber, particularly a acrylic rubber having cross-linkable groups.

Thus, the present acrylic rubber composition having such an action to prevent fixation can be effectively used as a molding material for sealing materials applicable to positions in direct contact with metallic materials or resin moldings.

PREFERRED EMBODIMENTS OF THE INVENTION

The present invention with be explained below in detail, referring to Examples.

EXAMPLES 1 to 3

Chlorine-containing acrylic rubber PA404 (trademark of a product made by Nippon Mektron K. K., Japan)

|  | 100 parts by weight |  |
|---|---|---|
| HAF Carbon black | 60 | |
| Stearic acid | 1 | |
| 4,4'-(α, α-dimethylbenzyl) diphenylamine | 2 | |
| Sodium stearate | 3 | |
| Potassium stearate | 0.25 | |
| Sulfur | 0.3 | |
| Tri(2-ethylhexyl) phosphate | 5 | (Example 1) |
| Tri(2-ethylhexyl) phosphate | 10 | (Example 2) |
| Tri(2-ethylhexyl) phosphate | 30 | (Example 3) |

The foregoing components were kneaded together in open rolls according to the ordinary kneading procedure, and the resulting acrylic rubber composition was subjected to press-vulcanization at 180° C. for 8 minutes and then to secondary vulcanization at 150° C. for 15 hours to obtain an acrylic rubber sheet having a thickness of 2mm.

EXAMPLE 4

Chlorine-containing acrylic rubber PA214 (trademark of a product made by Nippon Mektron K. K., Japan)

|  | 100 parts by weight |
|---|---|
| HAF Carbon black | 55 |
| Stearic acid | 1 |
| 4,4'-(α, α-dimethylbenzyl)diphenylamine | 2 |
| Sodium stearate | 3 |
| 2,4,6-trimercaptotriazine | 1.2 |
| Tri(2-ethylhexyl) phosphate | 10 |

The foregoing components were kneaded and subjected to vulcanization and molding in the same manner as in Example 1.

EXAMPLE 5

Epoxy-containing acrylic rubber PA303 (trademark of a product made by Nippon Mektron K. K., Japan)

|  | 100 parts by weight |
|---|---|
| HAF Carbon black | 55 |
| Stearic acid | 1 |
| 4,4'-(α,α-dimethylbenzyl) diphenylamine | 2 |
| Zinc dimethyldithiocarbamate | 2 |
| Ferric dimethyldithiocarbamate | 0.5 |
| Tri(2-ethylhexyl) phosphate | 10 |

The foregoing components were kneaded and subjected to vulcanization and molding in the same manner as in Example 1.

Comparative Example 1

In Example 1, no tri(2-ethylhexyl) phosphate was used.

Comparative Example 2

In Example 1, 50 parts by weight of tri(2-ethylhexyl) phosphate was used in place of 5 parts by weight of tri(2-ethylhexyl) phosphate.

Comparative Examples 3 to 10

In Example 2, 10 parts by weight of one of the following plasticizer was used in place of 10 parts by weight of tri(2-ethylhexyl) phosphate.

| Comp. Ex. | Plasticizer |
|---|---|
| 3 | Tributyl phosphate |
| 4 | Dioctyl phtalate |
| 5 | Tricresyl phosphate |
| 6 | Dioctyl adipate |
| 7 | Dioctyl sebacate |
| 8 | Polyether-based plasticizer RS-700 (trademark of a product made by Asahi Denka K. K., Japan) |
| 9 | Trioctyl trimellitate |
| 10 | Paraffin oil PW-380 (trademark of a product made by Idemitsu Kosan K. K., Japan) |

Test pieces, 10 mm×60 mm, were cut out of the rubber sheets prepared in the foregoing Examples and Comparative Examples and placed on soft steel (SPCC) plates, 20 mm×20 mm×0.6 mm, respectively, through a Teflon sheet mask, 20 mm×20 mm×0.05 mm, having a large hole, 5 mm×15 mm, at the center to bring the rubber sheet into contact with the SPCC plates in the hole of the Teflon sheet mask. Then, pairs of the test piece and the SPCC plates were compressed by 25%, and left standing in air or dipped in engine oil in that state at 140° C. for 100 hours or 800 hours. Then, the adhesiveness (unit: gf/cm) between the rubber sheet and the SPCC plate was measured by an autograph while peeling the rubber sheet off the SPCC plate as an indicator for the effect on the prevention of fixation.

The results are shown in the following Table, together with normal physical properties and compression sets (150° C. for 70 hours by 25%). Low temperature resistance ($TR_{10}$) and heat resistance (changes in the normal physical properties after being left standing in air at 150° C. for 70 hours) were also measured for all the test pieces, but no significant differences were observed between Examples and Comparative Examples.

TABLE

| | | Normal physical properties | | | | Adhesiveness | | | |
|---|---|---|---|---|---|---|---|---|---|
| | | Hardness | Tensile strength | Elongation | Compression set | In air | | In engine oil | |
| | | (JIS-A) | (kg/cm$^2$) | (%) | (%) | 100 hrs | 800 hrs | 100 hrs | 800 hrs |
| Example | 1 | 65 | 137 | 190 | 40 | 50 | 130 | 0 | 0 |
| " | 2 | 63 | 125 | 200 | 45 | 0 | 50 | 0 | 0 |
| " | 3 | 54 | 83 | 280 | 62 | 0 | 50 | 0 | 0 |
| " | 4 | 62 | 108 | 180 | 35 | 0 | 100 | 0 | 0 |
| " | 5 | 63 | 106 | 270 | 62 | 0 | 80 | 0 | 0 |
| Comp. Ex. | 1 | 68 | 146 | 190 | 36 | 260 | 600 | 660 | >1000 |
| " | 2 | 48 | 38 | 360 | 88 | 0 | 40 | 0 | 0 |
| " | 3 | 63 | 110 | 200 | 55 | 150 | 320 | 230 | 700 |
| " | 4 | 62 | 120 | 210 | 45 | 210 | 430 | 450 | >1000 |
| " | 5 | 62 | 113 | 200 | 52 | 130 | 280 | 190 | 620 |
| " | 6 | 62 | 121 | 220 | 50 | 240 | 490 | 520 | >1000 |
| " | 7 | 62 | 126 | 220 | 48 | 220 | 520 | 570 | >1000 |
| " | 8 | 62 | 128 | 210 | 45 | 230 | 480 | 580 | >1000 |
| " | 9 | 62 | 123 | 200 | 43 | 250 | 550 | 620 | >1000 |
| " | 10 | 64 | 112 | 190 | 43 | 240 | 500 | 610 | >1000 |

What is claimed is:

1. In a sealing member provided for compressed contact with a metal surface, the improvement wherein said sealing member comprises acrylic rubber and a fixation-preventing agent which causes said sealing member to remain releasable from the metal surface after compressed contact therewith, said fixation-preventing agent consisting essentially of trioctyl phosphate.

2. A sealing member according to claim 1, wherein said sealing member comprises about 100 parts by weight of said acrylic rubber and between about 2 and 40 parts by weight of said tri(2-ethylhexyl) phosphate.

3. A sealing member according to claim 1, wherein said acrylic rubber comprises polymers or copolymers of (a) alkyl acrylates having an alkyl group with 1 to 8 carbon atoms, or (b) alkoxyalkyl acrylates having an alkoxyalkylene group with 2 to 8 carbon atoms.

4. A sealing member according to claim 3, wherein said acrylic rubber comprises a monomer having a cross-linkable group which is copolymerized with said polymers or copolymers.

5. A sealing member according to claim 4, wherein the monomer having the cross-linkable group is a vinyl monomer having a member selected from the group consisting of an epoxy group, a carboxyl group, a reactive halogen, a hydroxyl group or an amido group.

6. A sealing member according to claim 4, wherein the monomer having the cross-linkable group is a dienic monomer.

7. A sealing member according to claim 4, wherein the monomer having the cross-linkable group comprises about 0.1 to 10 mole percent of the acrylic rubber.

8. A sealing member according to claim 3, wherein greater than zero and not more than 10 mole percent of the alkyl acrylate or the alkoxyalkyl acrylate is replaced with other copolymerizable vinyl monomers.

9. A sealing member according to claim 4, wherein greater than zero and not more than 10 mole percent of the alkyl acrylate or the alkoxyalkyl acrylate is replaced with other copolymerizable vinyl monomers.

10. A sealing member according to claim 1, wherein said metal surface comprises cast iron or steel.

* * * * *